United States Patent [19]

Matsumoto

[11] Patent Number: 4,782,443
[45] Date of Patent: Nov. 1, 1988

[54] MAIN STORAGE CONTROL SYSTEM FOR VIRTUAL COMPUTING FUNCTION SYSTEM WITH PLURAL ADDRESS MODES IN MAIN STORAGE ACCESS OPERATIONS

[75] Inventor: Toshio Matsumoto, Yokohama, Japan

[73] Assignee: Fujitsu Limited, Kawasaki, Japan

[21] Appl. No.: 929,796

[22] Filed: Nov. 13, 1986

[30] Foreign Application Priority Data

Nov. 13, 1985 [JP] Japan .................. 60-254027
Nov. 13, 1985 [JP] Japan .................. 60-254029

[51] Int. Cl.$^4$ .................................... G06F 12/02
[52] U.S. Cl. ........................................ 364/200
[58] Field of Search ........................... 364/200, 900

[56] References Cited

U.S. PATENT DOCUMENTS 4,615,006 9/1986 Hirano ........................... 364/200

Primary Examiner—Raulfe B. Zache
Attorney, Agent, or Firm—Staas & Halsey

[57] ABSTRACT

A main storage access control system for a virtual computing function system includes an address register for registering memory addresses used for accessing a main storage and being operated under a plurality of address modes having different effective bit lengths concerning the memory addresses, a tag register for registering tag bits for individually designating the address registers, and a selection unit for selecting the designation of address registers designated by the tag bits by means of an operand address of an instruction which is to be executed by the program of the virtual machine monitoring region. The address mode is changed to the address mode used by the virtual computing function system by means of the output signal of the selection means. The method concerning the conversion of an access key by the output of a register designation detection unit in a virtual computing function system is also treated.

2 Claims, 5 Drawing Sheets

4,782,443

MAIN STORAGE CONTROL SYSTEM FOR VIRTUAL COMPUTING FUNCTION SYSTEM WITH PLURAL ADDRESS MODES IN MAIN STORAGE ACCESS OPERATIONS

BACKGROUND OF THE INVENTION

1. Field of the Invention

The present invention relates to a main storage access control system for a virtual computing function system wherein a virtual computing function is realized by using a plurality of address modes in access operation for a main storage.

2. Description of the Related Arts

A virtual computing function system is well known in which a main storage has a plurality of virtual machine regions and a virtual machine monitoring region. In such a system, each of the virtual machine regions is under the control of the virtual machine monitoring region. A virtual computing function which is selected by the virtual machine monitoring region is executed by a central processor unit of a real computer.

In the virtual computing function system, an operating system for the virtual computing function system carries out a supervision of operations of the virtual computing function system. Where the result of supervision of n operation of a virtual computing function system affects another operation of the virtual computing function system, for example, in the case of a translation look aside buffer (TLB) or the like, a participation of a virtual machine monitoring region of the like takes place. However, the participation of such a virtual machine monitoring region tends to cause an extension of the time required for execution of the programs, and accordingly, tends to lower the efficiency of the virtual computing function system.

When a virtual machine monitoring region carries out an access to a virtual machine region, for the virtual machine monitoring region to represent the function of the virtual machine region, it is necessary to establish an address in accordance with the address mode which is designated by the virtual machine region.

Hence, when a virtual machine monitoring region carries out an access to a virtual machine region, it is necessary to discriminate the address mode of the virtual machine region and change the mode to the discriminated address mode or to carry out the equivalent address treatment, which causes a lowering of the efficiency of the control of the virtual computing function system because of the resultant undesirable increase of the overhead.

SUMMARY OF THE INVENTION

It is an object of the invention to provide an improved main storage access control system for a virtual computing function system in which the control in relation to the address mode of the virtual machine region is curtailed, and accordingly, the overhead in the operation of the virtual computing function system can be reduced.

In accordance with the fundamental aspect of the present invention, there is provided a main storage access control system for a virtual computation function system in which programs of virtual machine regions and a virtual machine monitoring region are executed, the system including: an address register for registering memory addresses used for accessing a main storage, the address register being operated under a plurality of address modes having different effective bit lengths concerning the memory addresses; a tag register for registering tag bits for designating individual address registers; and a selection unit for selecting the designation of address registers designated by the tag bits by means of an operand address of an instruction which is to be executed by the program of the virtual machine monitoring region. The address mode is changed to the address mode used by the virtual computation function system by means of the output signal of the selection unit.

In accordance with another aspect of the present invention, there is provided a main storage access control system for a virtual computing function system in which programs of virtual machine regions and a virtual machine monitoring region are executed, the system including: a main storage for storing programs and having a data portion and a key portion; an address register for registering memory addresses used for accessing the main storage; a key reference unit for comparing a memory protection key and an access key and carrying out an access control; a tag register for registering tag bits for individually designating the address register; and a register designation detection unit for detecting a designation of an address register by the tag bit; the output of the register designation detection unit being used for changing the access key to an access key for the virtual machine function.

DESCRIPTION OF THE PREFERRED EMBODIMENTS

Figure 1:
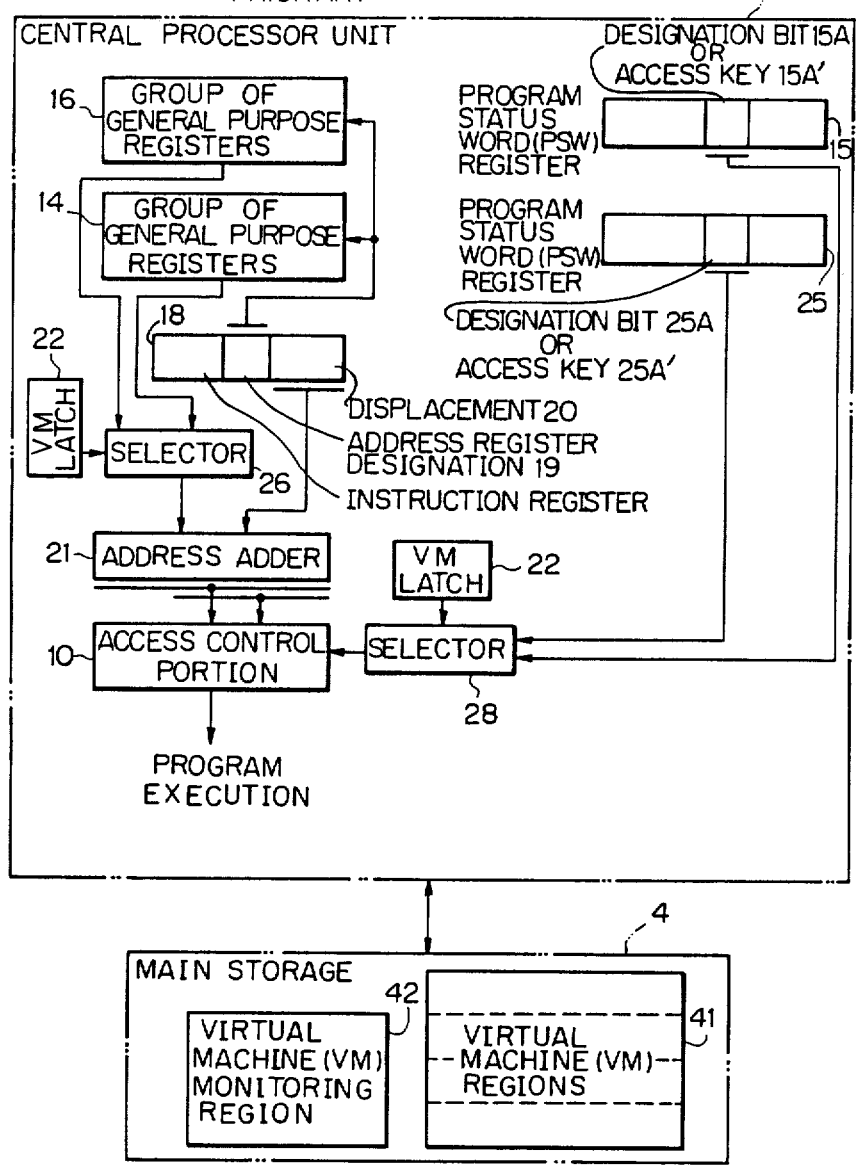
FIG. 1 is a schematic diagram of a prior art main storage access control system for a virtual computing function system.

Before commencing the description of the preferred embodiment, an example of the prior art system is described with reference to FIG. 1. The system of FIG. 1 includes a central processor device 1 and a main storage 4 having virtual machine (VM) regions 41 and a virtual machine (VM) monitoring region 42. The central processor device 1, is provided with groups of general purpose registers 14 and 16, an instruction register 18, a selector 26, an address adder 21, an access control portion 10, program status word (PSW) registers 15 and 25, a selector 28, and a virtual machine (VM) latch 22.

The virtual computing function system of FIG. 1 is operated in a manner such that the program stored in the virtual machine (VM) monitoring region 42 is executed by the central processor unit 1, and the control is transferred to the a program stored in the virtual machine region 41.

The central processor unit 1 has a plurality of address modes, for example, two address modes such as an address mode of 24 bits and an address mode of 31 bits. The information for designating the address mode is registered in the designation bit 25A of the program status word (PSW) register 25. For example, data "0" or "1" of the designation bit 25A corresponds to the address mode 24 bits and 31 bits, respectively.

A memory address for accessing the main storage 4 is designated by the data registered in the address register designation part 19 and the displacement part 20 of an instruction operand registered in the instruction register 18.

In calculating an address, the content of one of the general purpose registers 14 designated by the address register designation part 19 is summed with the address displacement value of the address displacement part 20 and, if necessary, preselected index value by the address adder 21. The output of the result of this summation is transferred to the access control portion 10.

The signal of the designation bit 25A is supplied through the selector 28 to the access control portion 10. Accordingly, a predetermined length of bits is designated by the designation bit 25A as an effective address.

Where a simulation is carried out by the participation of the virtual machine monitoring region 42, the virtual machine (VM) latch 22 is set upon transition to the VM monitoring, and the program status word (PSW) register 15 and the general purpose registers 16 for the VM monitoring are caused to become effective instead of the program status word (PSW) register 25 and the general purpose register 14.

The VM monitoring region 42 is constructed to operate in one of the above-described modes, such as in the 31 bit mode. When the VM monitoring region 42 is operated in the 31 bit mode, the designation bit 15A of the program status word register 15 is set to 31 bits.

When the VM monitoring region 42 carries out an access to the virtual machine regions 41 so that the virtual machine monitoring region 42 represents the function of the virtual machine regions 41, it is necessary to establish an address in accordance with the address mode which is designated by the virtual machine regions 41.

Hence, when the virtual machine monitoring region 42 carries out an access to a virtual machine regions 41, it is necessary to discriminate the address mode of the virtual machine regions 41 and change the mode to the discriminated address mode or to carry out the equivalent address treatment, which causes a lowering of the efficiency of the control of the virtual computing function system because of the resultant undesirable increase of the overhead.

Figure 2:
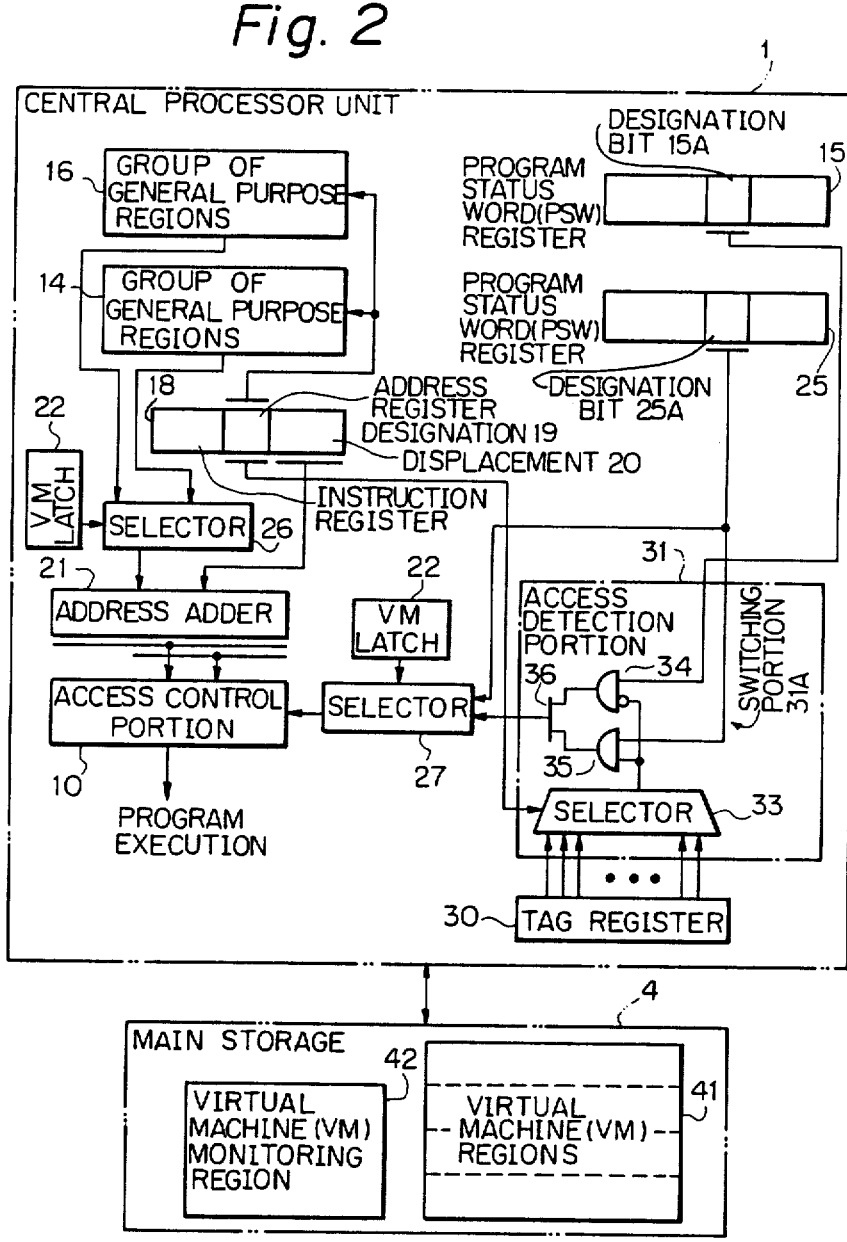
FIG. 2 is a a schematic diagram of a main storage access control system for a virtual computing function system according to an embodiment of the fundamental aspect of the present invention.

A main storage access control system for a virtual computing function system according to an embodiment of the fundamental aspect of the present invention is shown in FIG. 2. The system of FIG. 2 includes a central processor unit 1 and a main storage 4 having virtual machine (VM) regions 41 and a virtual machine (VM) monitoring region 42. The central processor unit 1 is provided with a group of general purpose registers 14 and 16, an instruction register 18, a selector 26, an address adder 21, an access control portion 10, program status word (PSW) registers 15 and 25, a selector 27, a tag register 30, and an access detection portion 31 having a selector 33, AND gates 34 and 35, and an OR gate 36. The AND gates 24 and 35 and OR gate 36 constitute a switching portion 31A.

The tag register 30 registers, for example, 16 tag bits, corresponding to the general purpose registers 16. In the tag register 30, the tag bits corresponding to general purpose register nos. (for example) 4, 5, and 8 in the group 16 of the general purpose registers, which are expected to be the address registers for registering memory addresses for accessing the VM regions 41, are preliminarily set to "1".

The tag bits of the tag register 30 are selected by the selector 33 under the control of the address register designation part 19. Based on this selection, the designation, by the address register designation part 19, of one of the general purpose registers designated by the tag register 30 is detected.

The AND logic of the output of the selector 33 and the designation bit 25A of the program status word register 25 is obtained by the AND gate 35. The output of the AND gate 35 is supplied through the OR gate 36 to the selector 27. The output of the selector 27, which represents the address mode designated by the virtual computing function system, is supplied to the access control portion 10.

The address control portion 10 receives the address having the bit length designated by the output of the selector 27 form the address adder 21, and carries out a control of access to the main storage 4.

In the operation of the system of FIG. 2, the tag register 30 has tag bits corresponding to the general purpose registers, and predetermined bits are preliminarily set by the VM monitoring region 42 in the tag register 30. During the execution of the VM monitoring region 42, usually, the designation bit 15A (representing an address operation of "31 bits") of the PSW register 15 is supplied as the output of the selector 27 to the access control portion 10 by the access detection portion 31.

When it is detected that the tag bit corresponding to the general purpose register designated by the address register designation part 19 of the instruction indicates that the designated register is to be used to access virtual machine regions, the designation bit 25A (representing an address operation of "24 bits") of the PSW register 25 is supplied as the output of the selector 27 to the access control portion 10 by the access detection portion 31.

Figure 3:
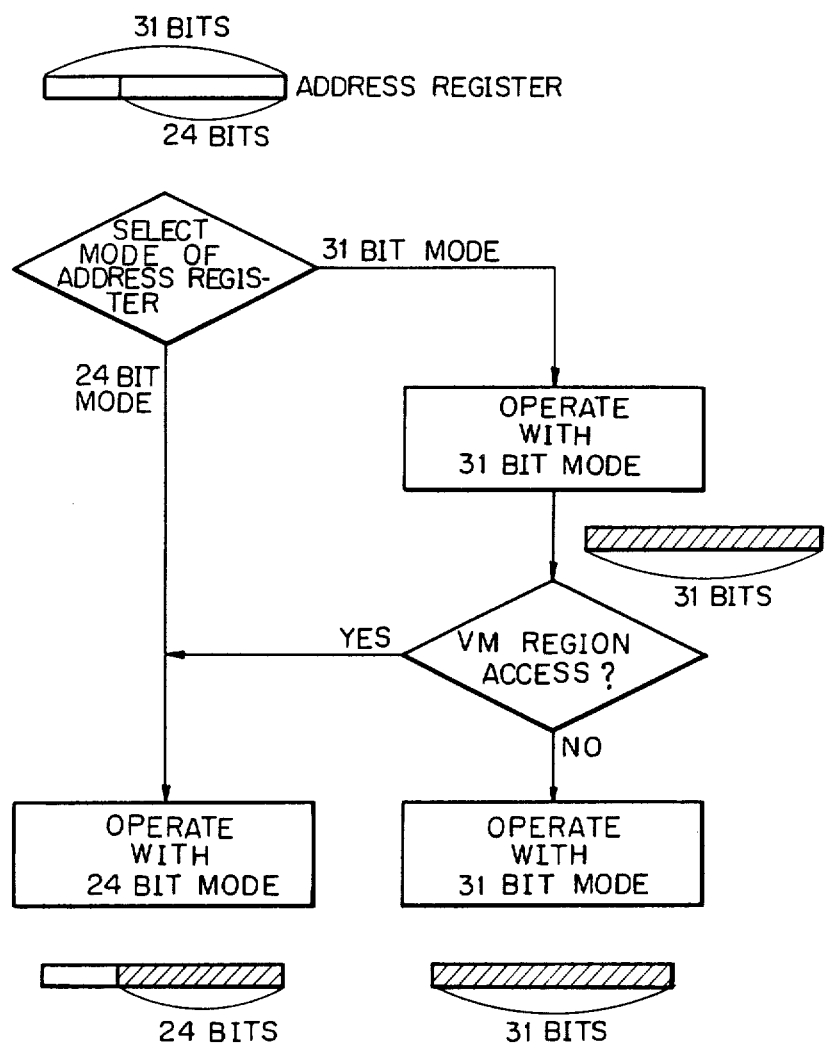
FIG. 3 illustrates the operation of the system of FIG. 2.
Figure 4:
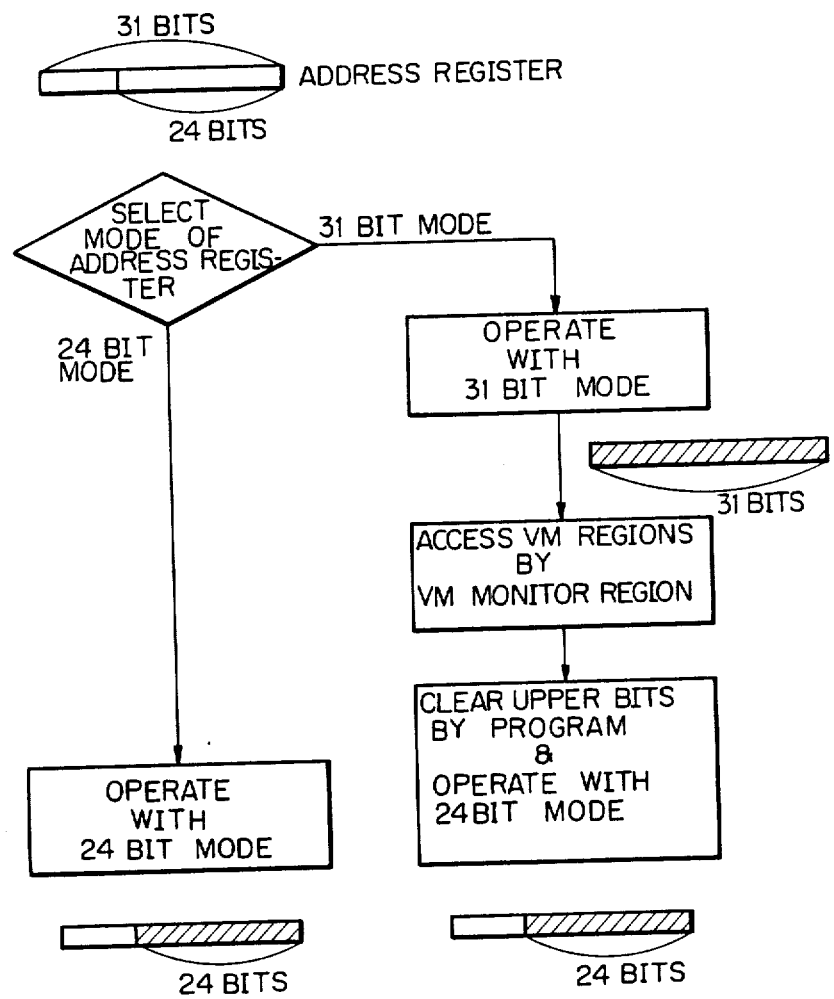
FIG. 4 illustrates the operation of the prior art system.

The above-described operation of the system of FIG. 2 is illustrated in FIG. 3. The usual manner is the processes of "operate with a 31 bits mode", through "a determination of whether the VM regions are accessed is "NO"" to "operate with the 31 bits mode". When a general purpose register designated by the tag register is also designated by the address register designation part 19 of the instruction, the determination of whether the VM regions are accessed is changed to "YES", and the process proceeds to "operate with 24 bits mode". For comparison, the prior art process is illustrated in FIG. 4. It is noted that, in the prior art process, the change from "31 bits mode" to the "24 bits mode" upon the access of VM regions by the VM monitoring region is carried out by the execution of a prepared program by which the upper 7 bits are cleared from "31 bits" to realize "24 bits".

Figure 5:
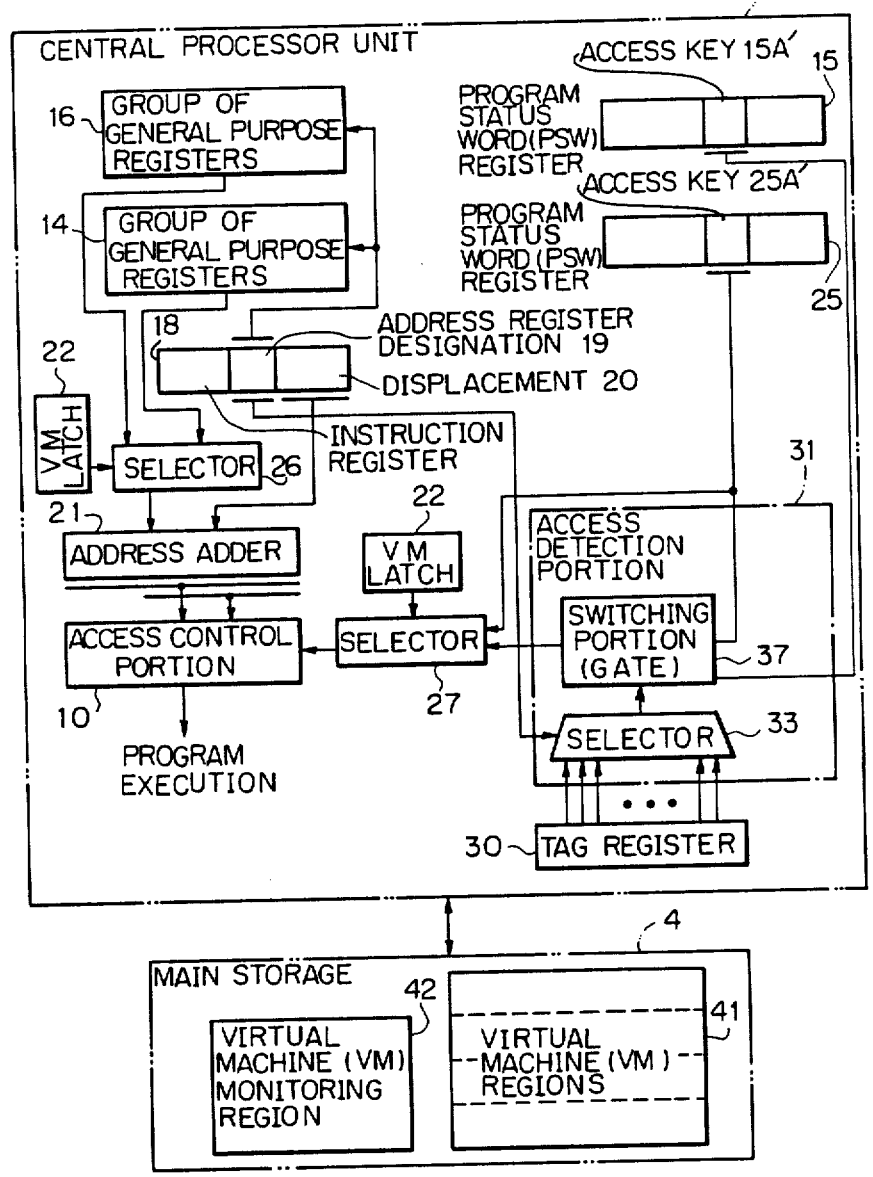
FIG. 5 is the schematic diagram of a main storage access control system for a virtual computing function system according to an embodiment of another aspect of the present invention.

A main storage access control system for a virtual computing function system according to an embodiment of another aspect of the present invention in shown in FIG. 5.

This embodiment of FIG. 5 is directed to solving the problem in the prior art system shown in FIG. 1. In FIG. 5, access control is carried out by the access key 15A', 25A'0 designated by the virtual machine computation function system for accessing the virtual machine regions 41. Usually, an access key is provided corresponding o each of the virtual machine regions VM0, VM1, and VM2, and the virtual machine monitoring region. Access to a region of the main storage is carried out after confirming the coincidence of the key. For example, a key may be represented by data of 4 bits.

The system of FIG. 5 includes a central processor unit 1 and a main storage 4 having VM regions 41 and a VM monitoring region 42. The central processor device 1 is provided with groups of general purpose registers 14 and 16, an instruction register 18, a selector 26, and address adder 21, an access control portion 10, PSW registers 15 and 25, a selector 27, a tag register 30, and an access detection portion 31 having a selector 33 and a switching portion (gate) 37.

The tag register 30 registers, for example, 16 tag bits, corresponding to the general purpose registers 16. In the tag register 30, the tag bits corresponding to general purpose register nos. (for example) 4, 5, and 8 in the group 16 of the general purpose registers, which are expected to be the address registers for registering memory addresses for accessing the VM regions 41, are preliminarily set to "1".

The tag bits of the tag register 30 are selected by the selector 33 under the control of the address register designation part 19. Based on this selection, whether or not one of the general purpose registers is to be used to access the virtual machine regions is determined by the corresponding bit of the tag register 30.

The switching portion 37 is controlled by the output of the selector 33, and the access key 25A' of the virtual machine computation function system is transmitted to the output terminal of the selector 27.

During the execution of the VM monitor region 42, usually the data "0" is supplied as an access key to the access control portion 10.

Only when a general purpose register is designated by a corresponding bit in the tag register 30 as an address register for generating an access address, is switching to the access key 25A' of the virtual machine computing function system carried out.

The access control portion 10 carries out an access control on the bases of the access key supplied form the selector 27.

In the operation of the system of FIG. 5, the tag register 30 has tag bits corresponding to the general purpose registers. In the tag register 30, predetermined bits are preliminarily set by the VM monitoring region 42. During the execution of the VM monitoring region, usually the access key "0" is delivered form the selector 27. When the designation, by the address register designation part 19, of the general purpose register designated by the tag register 30 is detected, a switching operation is carried out to deliver the access key 25A' from the selector 27.

I claim:

1. A main storage access control system for a virtual computing function system, including a central processing unit and a main storage, executing programs stored in virtual machine regions and a virtual machine monitoring region of the main storage, the programs including instructions with a register designating portion, said system comprising:

address registers in groups of general purpose registers in the central processing unit, used for calculating memory addresses for accessing the main storage, said address registers being operated under a plurality of address modes for memory addresses having different effective bit lengths, the address designating portion of the instructions designating one of the general purpose registers in the central processing unit;

a tag register for registering tag bits indicating a mode of use of said address registers, each bit of said tag register corresponding to one of the general purpose registers operating as one of said address registers, the address designating portion of the instructions designating one of the tag bits of said tag register; and selection means in the central processing unit, connected to said tag register, for generating an output signal selecting the mode of use of the one of said address registers designated by the address designating portion of one of the instructions in dependence upon the one of the tag bits corresponding thereto by means of an operand address on one of the instructions to be executed by the program stored in the virtual machine monitoring region, the mode of use of said address registers being determined by the output signal of said selection means.

2. A main storage access control system for a virtual computing function system, including a central processing unit for executing programs from virtual machine regions and a virtual machine monitoring region, said system comprising:

a main storage comprising a progam portion for storing programs, a data portion and a key portion, the programs including instructions with a register designating portion;

address registers for calculating memory addresses for accessing said main storage, said address registers being operated under a plurality of address modes for memory addresses having different effective bit lengths, the address designating portion of the instructions designating one of the general purpose registers;

key reference means in the central processing unit for comparing a memory protection key and an access key and carrying out access control;

a tag register in the central processing unit for registering tag bits indicating a mode of use of said address registers, each bit of said tag register corresponding to one of the general purpose registers operating as one of said address registers, the address designating portion of the instructions designating one of the tag bits of said tag register; and access detection means in the central processing unit, connected to said tag register, for detecting the mode of use of the one of said address registers designated by the address designating portion of one of the instructions in dependence upon the one of the tag bits corresponding thereto, and for controlling switching to a predetermined access key to perform a function of the virtual machine computing function system.

* * * * *